United States Patent
Li et al.

(10) Patent No.: US 9,791,615 B2
(45) Date of Patent: Oct. 17, 2017

(54) LIGHT GUIDE PLATE AND MANUFACTURING METHOD THEREOF, BACKLIGHT MODULE

(71) Applicants: BOE Technology Group Co., Ltd., Beijing (CN); Beijing Boe Optoelectronics Technology Co., Ltd., Beijing (CN)

(72) Inventors: Rui Li, Beijing (CN); Hongjun Yu, Beijing (CN); Hong Zhu, Beijing (CN); Yong Song, Beijing (CN); Hongkun Zhang, Beijing (CN); Jun Long, Beijing (CN); Gang Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/785,601

(22) PCT Filed: May 7, 2015

(86) PCT No.: PCT/CN2015/078447
§ 371 (c)(1),
(2) Date: Oct. 19, 2015

(87) PCT Pub. No.: WO2016/086594
PCT Pub. Date: Jun. 9, 2016

(65) Prior Publication Data
US 2016/0356946 A1    Dec. 8, 2016

(30) Foreign Application Priority Data

Dec. 4, 2014 (CN) .......................... 2014 1 0738393

(51) Int. Cl.
*B29D 11/00* (2006.01)
*F21V 8/00* (2006.01)
(Continued)

(52) U.S. Cl.
CPC ........ *G02B 6/0061* (2013.01); *B29C 35/0805* (2013.01); *B29C 59/16* (2013.01);
(Continued)

(58) Field of Classification Search
CPC .. G02B 6/0021; G02B 6/0041; G02B 6/0055; G02B 6/0061
See application file for complete search history.

(56) References Cited

U.S. PATENT DOCUMENTS

2006/0146573 A1* 7/2006 Iwauchi ............... G02B 6/0018
362/621
2010/0265694 A1* 10/2010 Kim ..................... G02B 6/0021
362/97.1
(Continued)

FOREIGN PATENT DOCUMENTS

CN    102052600        5/2011
CN    102052600 A      5/2011
(Continued)

OTHER PUBLICATIONS

International Search Report and Written Opinion with English Language Translation, dated Aug. 17, 2015, Application No. PCT/CN2015/078447.
(Continued)

*Primary Examiner* — Julie Bannan
(74) *Attorney, Agent, or Firm* — Blakely Sokoloff Taylor & Zafman LLP

(57) ABSTRACT

The present invention relates to the field of display techniques, and discloses a light guide plate and a manufacturing
(Continued)

method thereof, as well as a backlight module; the light guide plate comprises a light guide plate body and lattice points, wherein the light guide plate body is provided with a light output surface, and a receiving groove for receiving a light source is formed in a surface of the light guide plate body facing away from the light output surface thereof, and a side surface and a bottom surface of the receiving groove form a light input surface. The lattice points are distributed inside the light guide plate body along a plane parallel with the light output surface; the further the lattice points are distanced from the light input surface, the more densely they are distributed. When the above light guide plate is in use, the light source is situated in the receiving groove, and light emitted from the light source is directed into the light guide plate through the side surface and the bottom surface of the receiving groove. Besides, since the further the lattice points are distanced from the light input surface, the more densely they are distributed, the uniformity of light emitted from the light output surface of the light guide plate body can be ensured; in addition, since the lattice points are located inside the light guide plate body, friction is avoided between the lattice points of the light guide plate and the reflecting sheet of the backlight module, which prolongs the life time of the backlight module.

5 Claims, 3 Drawing Sheets

(51) Int. Cl.
  G02B 6/00    (2006.01)
  B29C 35/08   (2006.01)
  B29C 59/16   (2006.01)
  B29L 11/00   (2006.01)
(52) U.S. Cl.
  CPC .......... B29D 11/00663 (2013.01); G02B 6/00 (2013.01); G02B 6/0021 (2013.01); G02B 6/0041 (2013.01); G02B 6/0055 (2013.01); G02B 6/0065 (2013.01); B29C 2791/009 (2013.01); B29L 2011/0075 (2013.01)

(56) References Cited

U.S. PATENT DOCUMENTS

| | | | | |
|---|---|---|---|---|
| 2011/0109839 A1* | 5/2011 | Zhu | ................... | G02F 1/133603 349/62 |
| 2011/0109843 A1* | 5/2011 | Jung | ................... | G02B 6/0036 349/65 |
| 2012/0013811 A1* | 1/2012 | Shimizu | ............... | G02B 6/0016 348/739 |
| 2012/0034328 A1* | 2/2012 | Lee | ....................... | B23K 26/063 425/174.4 |
| 2012/0069579 A1* | 3/2012 | Koh | ...................... | G02B 6/0021 362/307 |
| 2013/0223096 A1* | 8/2013 | Kim | ...................... | G02B 6/0021 362/608 |
| 2014/0192553 A1 | 7/2014 | Liu et al. | | |

FOREIGN PATENT DOCUMENTS

| | | |
|---|---|---|
| CN | 102179631 | 9/2011 |
| CN | 102298169 A | 12/2011 |
| CN | 103314324 | 9/2013 |
| CN | 101331522 A | 10/2013 |
| CN | 103912797 A | 7/2014 |
| CN | 103962723 A | 8/2014 |
| CN | 104360432 | 2/2015 |
| KR | 20030078094 A | 10/2003 |
| TW | 201128244 | 8/2011 |

OTHER PUBLICATIONS

Office Action in Chinese Application No. 201410738393.6 dated Mar. 8, 2017, with English translation. 14 pages.
Office Action in Chinese Application No. 201410738393.6 dated Nov. 2, 2016, with English translation. 9 pages.
Office Action in Chinese Application No. 201410738393.6 dated May 24, 2017, with English translation.

* cited by examiner

LIGHT GUIDE PLATE AND MANUFACTURING METHOD THEREOF, BACKLIGHT MODULE

FIELD OF THE INVENTION

The present invention relates to the field of display techniques, and in particular to a light guide plate and a manufacturing method thereof, as well as a backlight module.

BACKGROUND OF THE INVENTION

In the prior art, a backlight module has a structure as shown in FIG. 1. The backlight module comprises a light guide plate 01, a reflecting sheet 02, a light source 03, a light source reflective cover 04, a diffusion plate 05, a lower prism film 06 and an upper prism film 07. The light guide plate 01 is provided with lattice points 011 on a surface facing the reflecting sheet 02, and the reflecting sheet 02 is situated on a side of the light guide plate 01 facing away from the diffusion plate 05.

In an existing backlight module, the lattice points 011 on the surface of the light guide plate 01 facing the reflecting sheet 02 are positioned outside the light guide plate 01. After the backlight module is assembled, the lattice points 011 on the light guide plate 01 will be in direct contact with the reflecting sheet 02; as a result, the lattice points 011 on the light guide plate 01 and the reflecting sheet 02 will scratch each other in case of a relative movement due to vibrations during delivery or use of the backlight module, which results in a short life time of the backlight module and influences the luminance uniformity of the backlight module.

SUMMARY OF THE INVENTION

The embodiments of the present invention provide a light guide plate and a manufacturing method thereof, as well as a backlight module. The light guide plate can prolong the life time of the backlight module and ensure the uniformity of light emitted from the backlight module.

To achieve the above object, the embodiments of the present invention provide the following technical solutions:

A light guide plate of a backlight module, comprising a light guide plate body and lattice points, wherein the light guide plate body is provided with a light output surface, and in a surface of the light guide plate body facing away from the light output surface thereof, a receiving groove for receiving a light source is formed. A side surface and a bottom surface of the receiving groove form a light input surface. The lattice points are distributed inside the light guide plate body along a plane parallel with the light output surface; the further the lattice points are distanced from the light input surface, the more densely they are distributed.

When the above light guide plate is in use, the light source is situated in the receiving groove formed in the surface of the light guide plate body facing away from the light output surface, and light emitted from the light source is directed into the light guide plate through the side surface and the bottom surface of the receiving groove. Besides, since the further the lattice points are distanced from the light input surface, the more densely they are distributed, this can ensure the uniformity of light emitted from the light output surface of the light guide plate body; in addition, since the lattice points are located inside the light guide plate body, friction is avoided between the lattice points of the light guide plate and the reflecting sheet of the backlight module, which prolongs the life time of the backlight module.

Preferably, a connection line between a central point of the bottom surface of the receiving groove and a central point of the light output surface is perpendicular to the light output surface.

Preferably, each of the lattice points satisfies the following formula:

$$D \geq 4d;$$

wherein:

D is a distance between the lattice points and the light output surface, and d is a distance between the lattice points and the surface of the light guide plate body facing away from the light output surface.

The embodiments of the present invention further provide a backlight module, comprising a reflecting sheet, a light source, and any light guide plate provided in the above technical solutions as well. The light output direction of the light source is opposite to the light input surface of the light guide plate, and the reflecting sheet is located on a side of the light guide plate facing away from the light output surface of the light guide plate.

The embodiments of the present invention further provide a method for manufacturing any light guide plate provided in the above technical solutions, comprising:

fixing a light guide plate body onto a worktable, wherein a surface of the light guide plate body facing away from the worktable is a light output surface, and the receiving groove is formed in a surface of the light guide plate body facing away from the light output surface;

adjusting a pulsed laser component such that a focus of a laser pulse emitted by the pulsed laser component is situated inside the light guide plate body at a height for forming the lattice points, and adjusting the worktable to adjust the focus of the laser pulse emitted by the pulsed laser component to correspond to an initial position of the light guide plate body;

turning on the pulsed laser component and actuating the light guide plate body with the worktable such that a material inside the light guide plate at a position of the focus of the laser pulse melts to form lattice points; the further the lattice points are distanced from the light input surface of the light guide plate, the more densely they are distributed.

Preferably, the pulsed laser component comprises a pulsed laser emitter and a condenser lens, the condenser lens being positioned between the pulsed laser emitter and the worktable; said adjusting a pulsed laser component such that a focus of a laser pulse emitted by the pulsed laser component is situated inside the light guide plate body at a height for forming the lattice points, specifically comprises:

adjusting a position of the condenser lens in a direction perpendicular to the light output surface of the light guide plate body so as to adjust the laser pulse emitted by the pulsed laser emitter after passing through the condenser lens to focus inside the light guide plate body at the height for forming the lattice points.

Preferably, the worktable comprises a fixation pedestal, a translation stage mounted on the fixation pedestal and slidable relative to the fixation pedestal in a direction parallel with the light output surface of the light guide plate body, a turntable mounted on the translation stage and rotable with respect to an axis line of the translation stage perpendicular to the light output surface of the light guide plate body, the light guide plate body being mounted on the turntable; said adjusting the worktable to adjust the focus of the laser pulse emitted by the pulsed laser component to correspond to an initial position of the light guide plate body, specifically comprises:

adjusting a position of the translation stage relative to the fixation pedestal, such that a connection line between the focus of the laser pulse emitted by the pulsed laser component and a central point of the bottom surface of the receiving groove in the light guide plate body is perpendicular to the light output surface of the light guide plate body.

Preferably, said turning on the pulsed laser component and actuating the light guide plate body with the worktable such that a material inside the light guide plate at a position of the focus of the laser pulse melts to form lattice points; the further the lattice points are distanced from the light input surface of the light guide plate, the more densely they are distributed, specifically comprises:

emitting a laser pulse with the pulsed laser component at a constant frequency; controlling a rotational speed of the turntable in accordance with formula $n=k/d1$;

controlling a movement speed of the translation stage in accordance with formula $v=m*(L1-d1)$;

wherein:

n is the rotational speed of the turntable, k is a preset constant, v is the movement speed of the translation stage, m is a preset constant, L1 is a length of the diagonal line of the light guide plate, and d1 is a distance between the focus of the laser pulse emitted by the pulsed laser component and a straight line; the straight line passes through the central point of the bottom surface of the receiving groove and is perpendicular to the light output surface of the light guide plate.

Preferably, said turning on the pulsed laser component and actuating the light guide plate body with the worktable such that a material inside the light guide plate at a position of the focus of laser pulse melts to form lattice points; the further the lattice points are distanced from the light input surface of the light guide plate, the more densely they are distributed, specifically comprises:

emitting a laser pulse with the pulsed laser component at a constant frequency;

controlling a rotational speed of the turntable in accordance with formula $n=k/d1$;

controlling the translation stage to move once in a direction facing away from the central point of the bottom surface of the receiving groove in accordance with formula $D1=j*(L1-d1)$ for each turn of the turntable;

wherein:

n is the rotational speed of the turntable, D1 is a distance over which the translation stage moves, k is a preset constant, j is a preset constant, L1 is a length of the diagonal line of the light guide plate, and d1 is a distance between the focus of the laser pulse emitted by the pulsed laser component and a straight line; the straight line passes through the central point of the bottom surface of the receiving groove and is perpendicular to the light output surface of the light guide plate prior to each movement.

DETAILED DESCRIPTION OF THE INVENTION

The technical solutions in the embodiments of the present invention shall be described in a clear and complete manner with reference to the drawings in the embodiments of the present invention. Obviously, the embodiments described here are only a part of the embodiments of the present invention, rather than all of them. Other embodiments obtainable by those having ordinary skills in the art without inventive efforts based on the embodiments of the present invention, shall all fall within the protection scope of the present invention.

Figure 1:
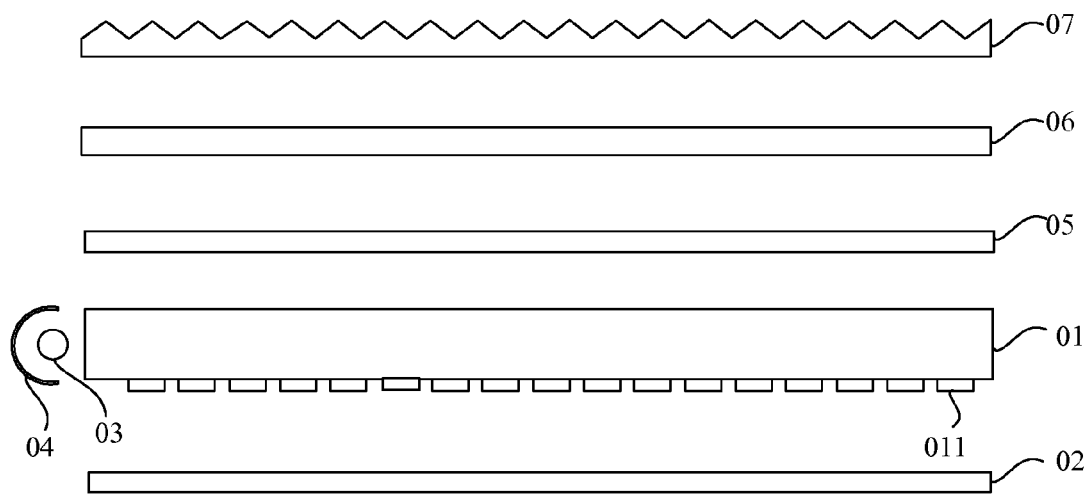
FIG. 1 is a schematic structural view of a backlight module in the prior art.
Figure 2:
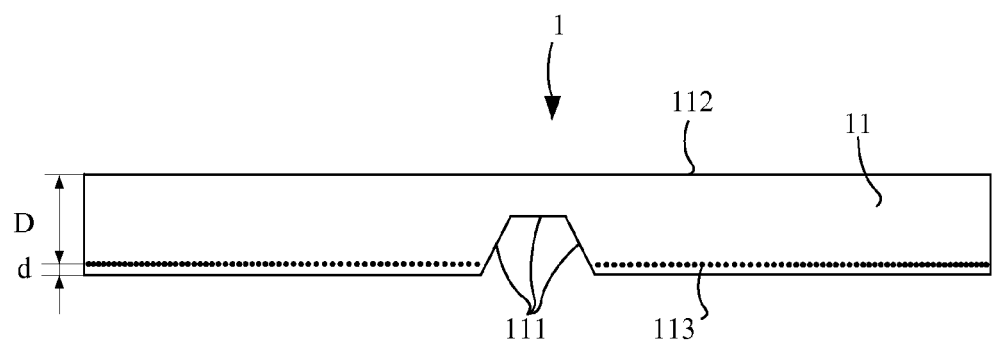
FIG. 2 is a schematic structural view of a light guide plate provided in an embodiment of the present invention.

Please refer to FIG. 2. FIG. 2 is a schematic structural view of a light guide plate provided in an embodiment of the present invention.

Figure 3:
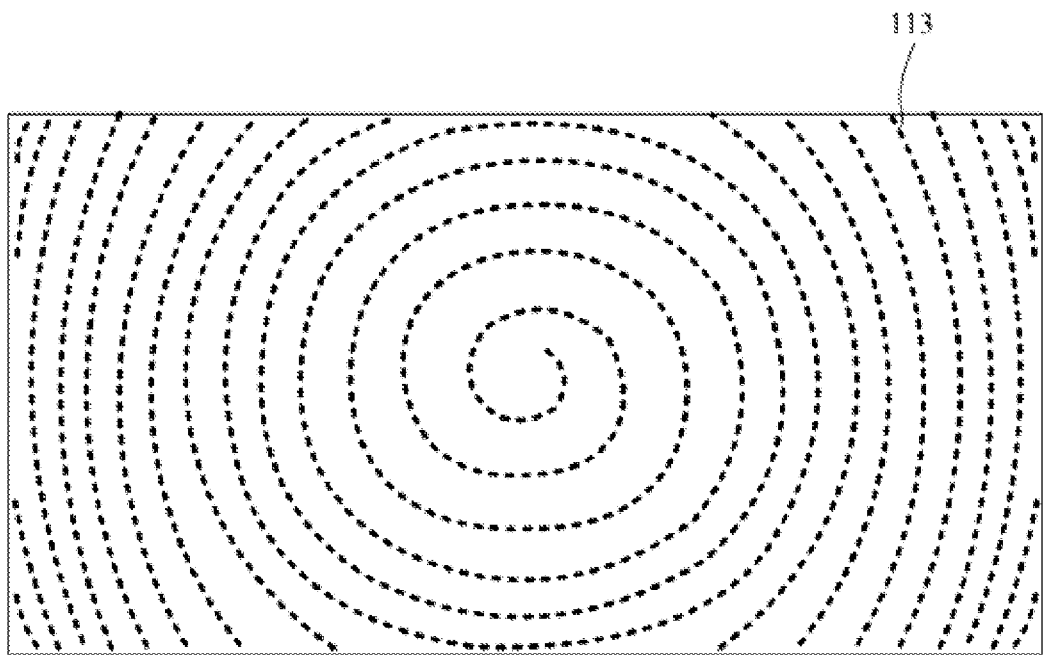
FIG. 3 is a schematic view of the distribution of lattice points in a light guide plate provided in an embodiment of the present invention.
Figure 4:
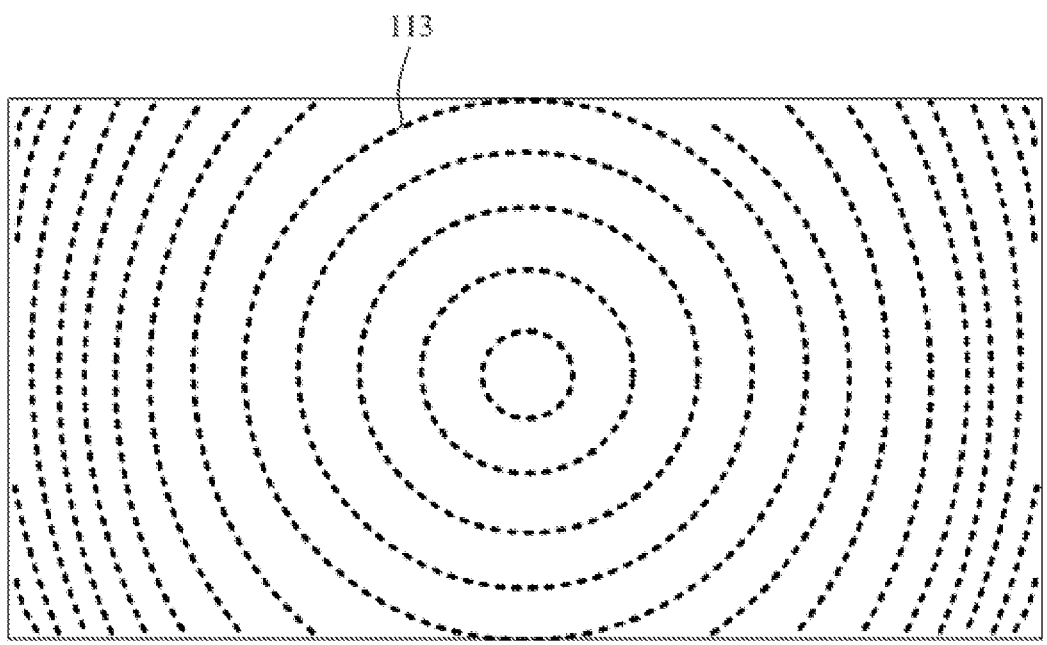
FIG. 4 is a schematic view of the distribution of lattice points in a light guide plate provided in a further embodiment of the present invention.

As shown in FIG. 2, a light guide plate 1 of a backlight module provided in an embodiment of the present invention comprises a light guide plate body 11 and lattice points 113, the light guide plate body 11 being provided with a light output surface 112; a receiving groove for receiving a light source is formed in a surface of the light guide plate body 11 facing away from the light output surface 112, and a side surface and a bottom surface of the receiving groove form a light input surface 111 as shown in FIG. 2; the light guide plate is provided with lattice points 113 which are distributed inside the light guide plate body 11 along a plane parallel with the light output surface 112; the further the lattice points 113 are distanced from the light input surface 111, the more densely they are distributed, specifically as shown in FIGS. 3 and 4.

When the above light guide plate 1 is in use, the light source is situated in the receiving groove formed in the surface of the light guide plate body 11 facing away from the light output surface, and light emitted from the light source is directed into the light guide plate through the side surface and the bottom surface of the receiving groove. Moreover, since the further the lattice points 113 are distanced from the light input surface 111, the more densely they are distributed (specifically as shown in FIGS. 3 and 4), the uniformity of light emitted from the light output surface 112 of the light guide plate body 11 can be ensured. The light source of the backlight module is embedded in the receiving groove, which can be an LED lamp, and light emitted from the LED lamp is directed into the light guide plate 1 through the bottom surface and the side surface of the receiving groove. The light propagates in the light guide plate 1, and is transmitted and reflected on an upper surface (i.e., the light output surface) of the light guide plate 1; among light which is reflected, part of the light propagates to the lattice points 113 of the light guide plate 1 where it is scattered, and part of the light is emitted out of the light guide plate 1 and then reflected back inside the light guide plate 1 by the reflecting sheet and continues propagating inside the light guide plate 1 until scattered out of the light guide plate 1 by the lattice points 113. Besides, since the lattice points 113 are located inside the light guide plate body 11, friction is avoided between the lattice points 113 of the light guide plate 1 and the reflecting sheet of the backlight module, which prolongs the life time of the backlight module.

In addition, a backlight module using the above light guide plate requires less light sources, consumes less power and can simplify the structure around the light guide panel 1 in the backlight module. Meanwhile, since the light source is embedded in the receiving groove, the thickness of the backlight module will not be increased.

More preferably, a connection line between a central point of the bottom surface of the receiving groove and a central point of the light output surface 112 is perpendicular to the light output surface 112. When the connection line between the central point of the bottom surface of the receiving groove and the central point of the light output surface 112 is perpendicular to the light output surface 112, an axis line of the receiving groove is coincident with that of the light guide plate body 11 such that the light source is situated right at the center of the light guide plate body, which can reduce the degree of complexity of arranging lattice points 113 inside the light guide plate body 11 and is beneficial for improving the luminance uniformity of the light output surface of the light guide plate.

In a preferred embodiment, in order to reduce the hindrance of the lattice points 113 to the propagation of light inside the light guide plate body 11, each of the lattice points 113 shall satisfy the following formula:

$$D \geq 4d;$$

wherein:

D is a distance between the lattice points 113 and the light output surface 112, and d is a distance between the lattice points 113 and the surface of the light guide plate body 11 facing away from the light output surface 113.

When the distribution position of each of the lattice points 113 inside the light guide plate body 11 satisfies the above condition, the hindrance of the lattice points 113 to the propagation of light inside the light guide plate body 11 can be reduced, and thereby the utilization of light directed into the light guide plate body 11 from the light source is improved and the luminance uniformity of the backlight module is enhanced.

The embodiments of the present invention further provide a backlight module, comprising a reflecting sheet, a light source, and any light guide plate provided in the above embodiments as well. The light output direction of the light source is opposite to the light input surface of the light guide plate, and the reflecting sheet is situated on a side of the light guide plate facing away from the light output surface of the light guide plate.

Figure 5:
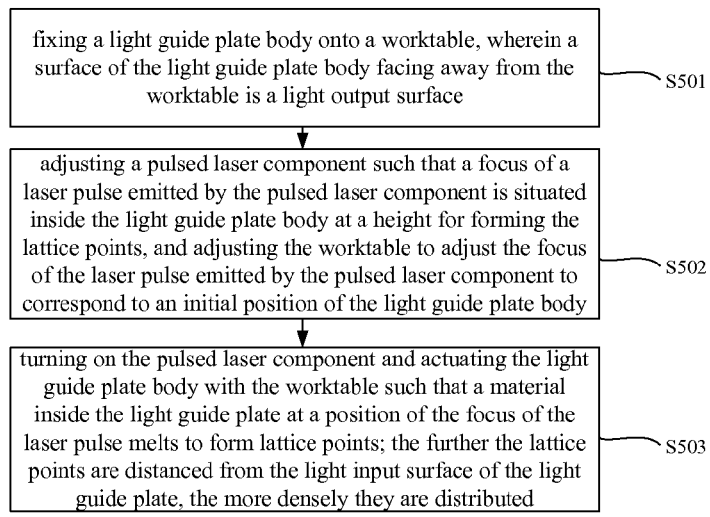
FIG. 5 is a schematic view of the flow of a method for manufacturing a light guide plate provided in an embodiment of the present invention.
Figure 6:
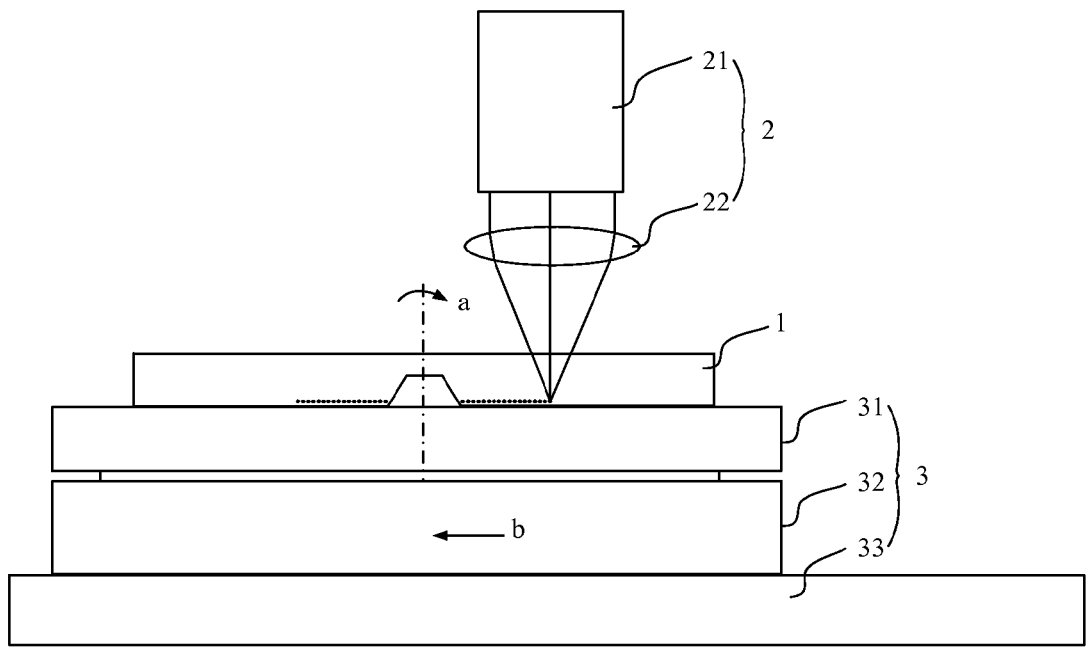
FIG. 6 is a schematic structural view of a device used in the method for manufacturing a light guide plate provided in an embodiment of the present invention.

As shown in FIGS. 5 and 6, an embodiment of the present invention further provides a method for manufacturing any light guide plate 1 provided in the above embodiments, comprising:

Step S501, fixing a light guide plate body onto a worktable 3, wherein a surface of the light guide plate body facing away from the worktable is a light output surface, and the receiving groove is provided in the surface of the light guide plate body facing away from the light output surface;

Step S502, adjusting a pulsed laser component 2 such that a focus of a laser pulse emitted by the pulsed laser component 2 is situated inside the light guide plate body at a height for forming the lattice points, and adjusting the worktable 3 to adjust the focus of the laser pulse emitted by the pulsed laser component 2 to correspond to an initial position of the light guide plate body;

Step S503, turning on the pulsed laser component and actuating the light guide plate body with the worktable such that a material inside the light guide plate at a position of the focus of the laser pulse melts to form lattice points; the further the lattice points are distanced from the light input surface of the light guide plate, the more densely they are distributed.

When the light guide plate 1 is manufactured by using the above manufacturing method, the lattice points 113 of the light guide plate 1 can be manufactured inside the light guide plate body 11; therefore, friction is avoided between the lattice points 113 of the light guide plate 1 and the reflecting sheet of the backlight module, which prolongs the life time of the backlight module.

Please refer to FIG. 6, the pulsed laser component 2 used in step S502 comprises a pulsed laser emitter 21 and a condenser lens 22, the condenser lens 22 being situated between the pulsed laser emitter 21 and the worktable 3; and now, said adjusting a pulsed laser component 2 such that a focus of a laser pulse emitted by the pulsed laser component 2 is situated inside the light guide plate body at a height for forming the lattice points in step S502, specifically comprises:

adjusting a position of the condenser lens 22 in a direction perpendicular to the light output surface of the light guide plate body so as to adjust the laser pulse emitted by the pulse laser emitter 21 after passing through the condenser lens 22 to be focused inside the light guide plate body at the height for forming the lattice points.

Please continue referring to FIG. 6, in a preferred embodiment, the worktable 3 comprises a fixation pedestal 33, a translation stage 32 mounted on the fixation pedestal 33 and slidable relative to the fixation pedestal 33 in a direction parallel with the light output surface of the light guide plate body, a turntable 31 mounted on the translation stage 32 and rotable with respect to an axis line of the translation stage 32 perpendicular to the light output surface of the light guide plate body. The movement direction of the translation stage 32 is indicated by direction b in FIG. 6, and the rotation direction of the turntable 31 with respect to the translation stage 32 is indicated by direction a in FIG. 6 (i.e., the dashed line in the drawing serves as a rotation axis), and the light guide plate body is mounted on the turntable 31; and now, said adjusting the worktable 3 to adjust the focus of the laser pulse emitted by the pulsed laser component 2 to correspond to an initial position of the light guide plate body in step S502, specifically comprises:

adjusting a position of the translation stage 32 relative to the fixation pedestal 33, such that a connection line between the focus of the laser pulse emitted by the pulsed laser component 2 and the central point of the bottom surface of the receiving groove in the light guide plate body is perpendicular to the light output surface of the light guide plate body.

In a specific embodiment, when the worktable is a structure as stated above comprising the fixation pedestal 33, the translation stage 32 and the turntable 31, said turning on the pulsed laser component 2 and actuating the light guide plate body with the worktable 3 such that a material inside the light guide plate at a position of the focus of the laser pulse melts to form lattice points; the further the lattice points are distanced from the light input surface of the light guide plate, the more densely they are distributed, specifically comprises:

emitting a laser pulse with the pulsed laser component 2 at a constant frequency;

controlling a rotational speed of the turntable in accordance with formula n=k/d1;

controlling a movement speed of the translation stage in accordance with formula v=m*(L1−d1);

wherein:

n is the rotational speed of the turntable, k is a preset constant, v is the movement speed of the translation stage, m is a preset constant, L1 is a length of the diagonal line of the light guide plate, and d1 is a distance between the focus of the laser pulse emitted by the pulsed laser component and a straight line; the straight line passes through the central point of the bottom surface of the receiving groove and is perpendicular to the light output surface of the light guide plate.

The distribution of the lattice points 113 in the light guide plate 1 obtained in this case is shown in FIG. 3.

In a further specific embodiment, when the worktable is a structure as stated above comprising the fixation pedestal 33, the translation stage 32 and the turntable 31, said turning on the pulsed laser component 2 and actuating the light guide plate body with the worktable 3 such that a material inside the light guide plate at a position of the focus of the laser pulse melts to form lattice points; the further the lattice points are distanced from the light input surface of the light guide plate, the more densely they are distributed, specifically comprises:

emitting a laser pulse with the pulsed laser component 2 at a constant frequency;

controlling a rotational speed of the turntable 31 in accordance with formula n=k/d1;

controlling the translation stage 32 to move once in a direction facing away from the central point of the bottom surface of the receiving groove in accordance with formula D1=j*(L1−d1) for each turn of the turntable;

wherein:

n is the rotational speed of the turntable 31, D1 is a distance over which the translation stage 32 moves, k is a preset constant, j is a preset constant, L1 is a length of the diagonal line of the light guide plate, and d1 is a distance between the focus of the laser pulse emitted by the pulsed laser component 2 and a straight line; the straight line passes through the central point of the bottom surface of the receiving groove and is perpendicular to the light output surface of the light guide plate prior to each movement.

The distribution of the lattice points 113 in the light guide plate 1 obtained in this case is shown in FIG. 4.

Obviously, those skilled in the art can make various improvements and modifications to the embodiments of the present invention without deviating from the spirits and scopes of the present invention. Thus if the improvements and modifications to the present invention fall within the scopes of the claims of the present invention and the equivalent techniques thereof, they are intended to be included in the present invention too.

What is claimed is:

1. A manufacturing method of a light guide plate; wherein the light guide plate comprises a light guide plate body and lattice points, the light guide plate body being provided with a light output surface, wherein a receiving groove for receiving a light source is formed in a surface of the light guide plate body facing away from the light output surface thereof, a side surface and a bottom surface of the receiving groove forming a light input surface; the lattice points are distributed inside the light guide plate body along a plane parallel with the light output surface, a distance d between the lattice points and the surface of the light guide plate body facing away from the light output surface is greater than zero; the further the lattice points are distanced from the light input surface, the more densely they are distributed; and wherein the manufacturing method comprises:

fixing the light guide plate body onto a worktable, and forming the receiving groove in the surface of the light guide plate body facing away from the light output surface;

adjusting a pulsed laser component such that a focus of a laser pulse emitted by the pulsed laser component is situated inside the light guide plate body at a height for forming the lattice points, and adjusting the worktable to adjust the focus of the laser pulse emitted by the pulsed laser component to correspond to an initial position of the light guide plate body;

turning on the pulsed laser component and actuating the light guide plate body with the worktable such that a material inside the light guide plate at a position of the focus of the laser pulse melts to form lattice points; the further the lattice points are distanced from the light input surface of the light guide plate, the more densely they are distributed.

2. The manufacturing method according to claim 1, wherein the pulsed laser component comprises a pulsed laser emitter and a condenser lens, the condenser lens being positioned between the pulsed laser emitter and the worktable; said adjusting a pulsed laser component such that a focus of a laser pulse emitted by the pulsed laser component is situated inside the light guide plate body at a height for forming the lattice points, specifically comprises:

adjusting a position of the condenser lens in a direction perpendicular to the light output surface of the light guide plate body so as to adjust the laser pulse emitted by the pulsed laser emitter after passing through the condenser lens to focus inside the light guide plate body at the height for forming the lattice points.

3. The manufacturing method according to claim 1, wherein the worktable comprises a fixation pedestal, a translation stage mounted on the fixation pedestal and slidable relative to the fixation pedestal in a direction parallel with the light output surface of the light guide plate body, a turntable mounted on the translation stage and rotable with respect to an axis line of the translation stage perpendicular to the light output surface of the light guide plate body, the light guide plate body being mounted on the turntable; said adjusting the worktable to adjust the focus of the laser pulse emitted by the pulsed laser component to correspond to an initial position of the light guide plate body, specifically comprises:

adjusting a position of the translation stage relative to the fixation pedestal, such that a connection line between the focus of the laser pulse emitted by the pulsed laser component and a central point of the bottom surface of the receiving groove in the light guide plate body is perpendicular to the light output surface of the light guide plate body.

4. The manufacturing method according to claim 3, wherein said turning on the pulsed laser component and actuating the light guide plate body with the worktable such that a material inside the light guide plate at a position of the focus of the laser pulse melts to form lattice points; the further the lattice points are distanced from the light input surface of the light guide plate, the more densely they are distributed, specifically comprises:

emitting a laser pulse with the pulsed laser component at a constant frequency;

controlling a rotational speed of the turntable in accordance with formula n=k/d1;

controlling a movement speed of the translation stage in accordance with formula v=m*(L1−d1);

wherein:

n is the rotational speed of the turntable, k is a preset constant, v is the movement speed of the translation stage, m is a preset constant, L1 is a length of the diagonal line of the light guide plate, and d1 is a distance between the focus of the laser pulse emitted by the pulsed laser component and a straight line; the straight line passes through the central point of the bottom surface of the receiving groove and is perpendicular to the light output surface of the light guide plate.

5. The manufacturing method according to claim 3, wherein said turning on the pulsed laser component and actuating the light guide plate body with the worktable such that a material inside the light guide plate at a position of the focus of laser pulse melts to form lattice points; the further the lattice points are distanced from the light input surface of the light guide plate, the more densely they are distributed, specifically comprises:

emitting a laser pulse with the pulsed laser component at a constant frequency;

controlling a rotational speed of the turntable in accordance with formula n=k/d1;

controlling the translation stage to move once in a direction facing away from the central point of the bottom surface of the receiving groove in accordance with formula D1=j*(L1−d1) for each turn of the turntable;

wherein:

n is the rotational speed of the turntable, D1 is a distance over which the translation stage moves, k is a preset constant, j is a preset constant, L1 is a length of the diagonal line of the light guide plate, and d1 is a distance between the focus of the laser pulse emitted by the pulsed laser component and a straight line; the straight line passes through the central point of the bottom surface of the receiving groove and is perpendicular to the light output surface of the light guide plate prior to each movement.

* * * * *